(12) United States Patent
Mermoud et al.

(10) Patent No.: US 11,232,372 B2
(45) Date of Patent: Jan. 25, 2022

(54) MERGING AND OPTIMIZING HETEROGENEOUS RULESETS FOR DEVICE CLASSIFICATION

(71) Applicant: Cisco Technology, Inc., San Jose, CA (US)

(72) Inventors: Grégory Mermoud, Veyras (CH); Jean-Philippe Vasseur, Saint Martin D'uriage (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 538 days.

(21) Appl. No.: 16/185,086

(22) Filed: Nov. 9, 2018

(65) Prior Publication Data
US 2020/0151616 A1 May 14, 2020

(51) Int. Cl.
*G06N 20/00* (2019.01)
*H04L 29/06* (2006.01)
*H04L 29/08* (2006.01)

(52) U.S. Cl.
CPC .......... *G06N 20/00* (2019.01); *H04L 63/10* (2013.01); *H04L 67/12* (2013.01)

(58) Field of Classification Search
CPC ........ G06N 20/00; G06N 20/20; G06N 5/003; G06N 5/025; H04L 63/10; H04L 67/12; H04L 67/303
See application file for complete search history.

(56) References Cited

U.S. PATENT DOCUMENTS

| | | | |
|---|---|---|---|
| 7,873,583 B2 | 1/2011 | Laxman et al. | |
| 10,361,913 B2* | 7/2019 | Ponnuswamy | .......... H04L 41/16 |
| 10,600,001 B2* | 3/2020 | Ponnuswamy | .......... G06F 16/35 |
| 10,939,349 B2* | 3/2021 | Pati | ....... H04W 36/08 |
| 2007/0160262 A1 | 7/2007 | Kim et al. | |
| 2014/0129686 A1* | 5/2014 | Haemel | ................. G06F 13/102 709/220 |
| 2017/0154281 A1 | 6/2017 | Ho et al. | |
| 2017/0373935 A1* | 12/2017 | Subramanian | ........ G06F 9/4856 |
| 2018/0225592 A1* | 8/2018 | Ponnuswamy | .......... G06F 16/35 |
| 2018/0227176 A1* | 8/2018 | Ponnuswamy | .......... H04L 41/16 |
| 2018/0300180 A1* | 10/2018 | Shepard | .............. G06F 11/0793 |
| 2019/0253319 A1* | 8/2019 | Kampanakis | .......... G06N 5/025 |
| 2020/0151616 A1* | 5/2020 | Mermoud | .............. G06N 5/003 |
| 2020/0396129 A1* | 12/2020 | Tedaldi | ................... H04L 43/10 |

OTHER PUBLICATIONS

Duin, et al., "Experiments with Classifier Combining Rules", MCS 2000, LNCS 1857, pp. 16-29, 2000, Springer-Verlag Berlin Heidelberg.

* cited by examiner

*Primary Examiner* — David R Lazaro
(74) *Attorney, Agent, or Firm* — Behmke Innovation Group; Kenneth J. Heywood; Jonathon P. Western (57) ABSTRACT

In one embodiment, a device classification service receives a plurality of device classification rulesets, each ruleset associating a set of device characteristics with a device type label. The device classification service forms a unified ruleset by resolving a conflict between conflicting device characteristics from two or more of the device classification rulesets. The device classification service trains a machine learning-based device classifier using the unified ruleset. The device classification service classifies, using telemetry data for a device in a network as input to the trained device classifier, the device with the device type label.

20 Claims, 7 Drawing Sheets

MERGING AND OPTIMIZING HETEROGENEOUS RULESETS FOR DEVICE CLASSIFICATION

TECHNICAL FIELD

The present disclosure relates generally to computer networks, and, more particularly, to merging and optimizing heterogeneous rulesets for device classification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device classification service receives a plurality of device classification rulesets, each ruleset associating a set of device characteristics with a device type label. The device classification service forms a unified ruleset by resolving a conflict between conflicting device characteristics from two or more of the device classification rulesets. The device classification service trains a machine learning-based device classifier using the unified ruleset. The device classification service classifies, using telemetry data for a device in a network as input to the trained device classifier, the device with the device type label.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
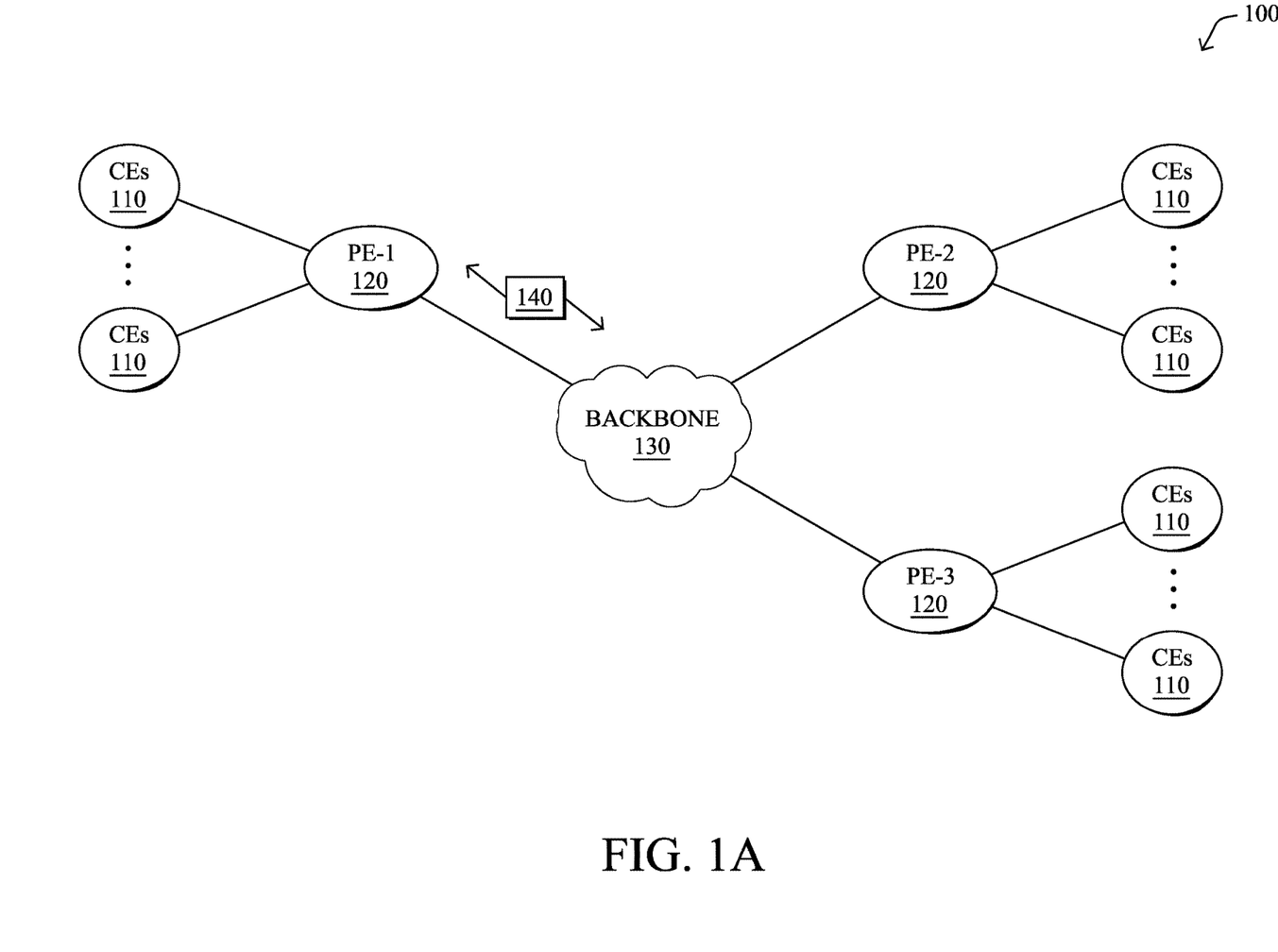
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
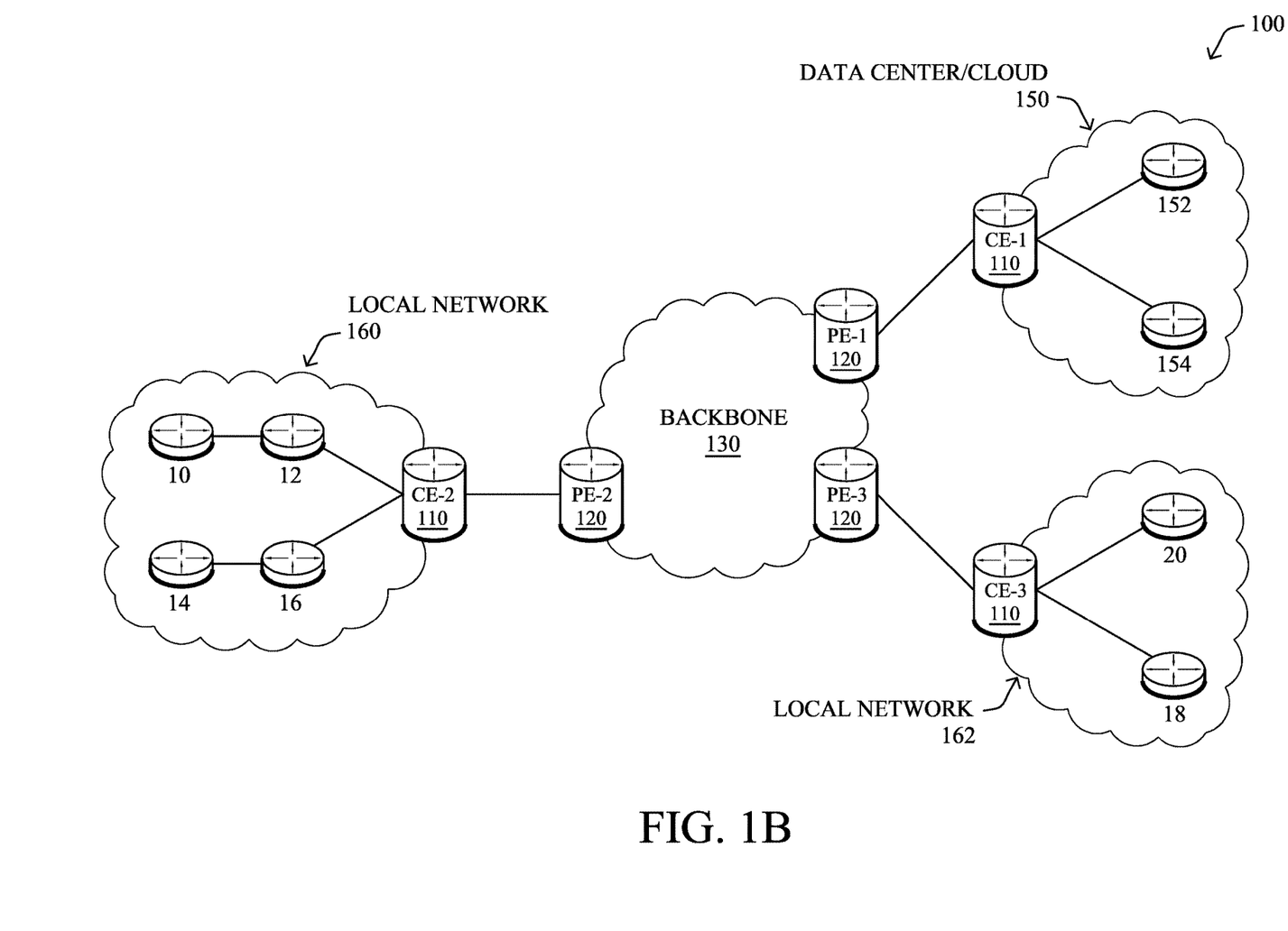

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
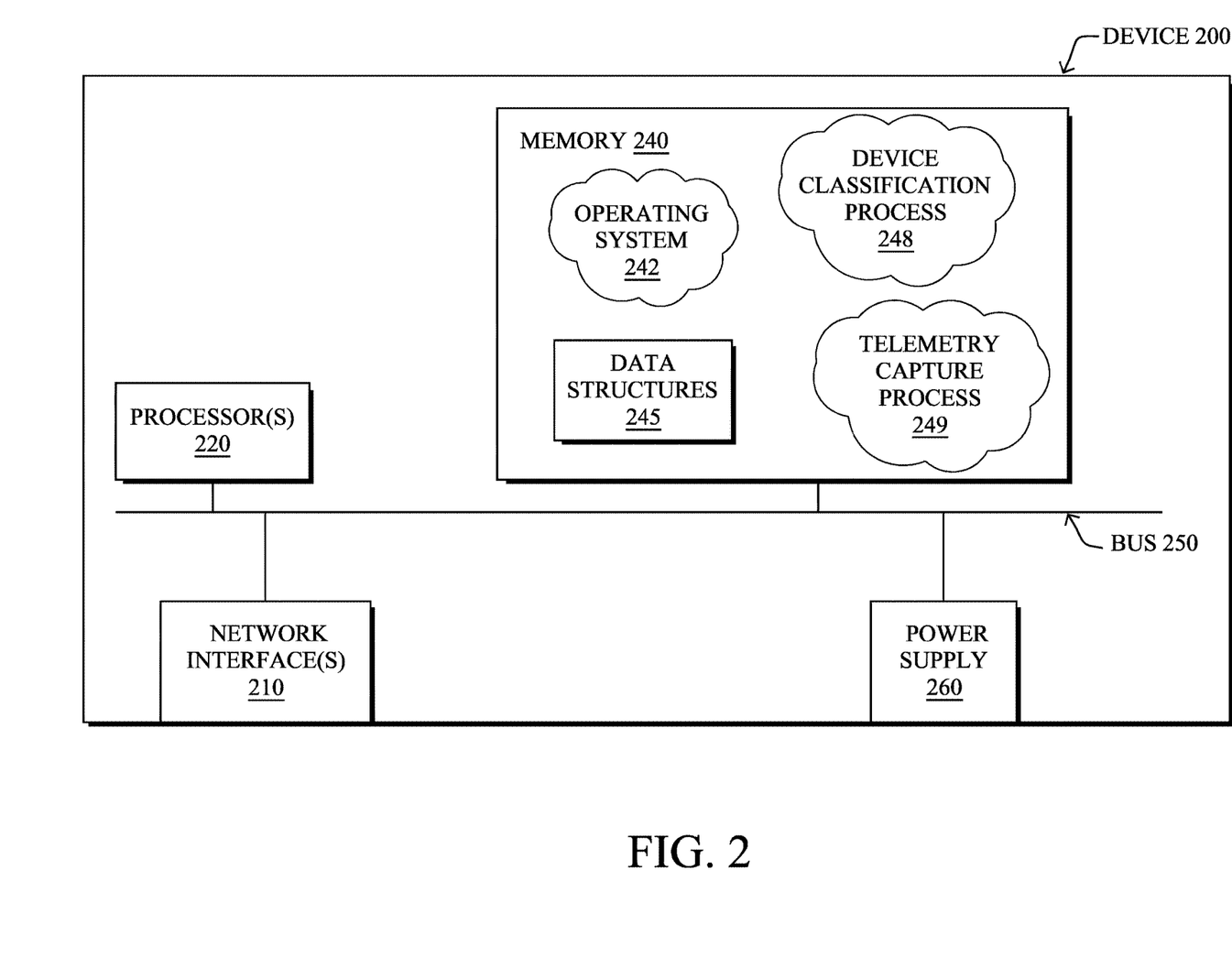
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
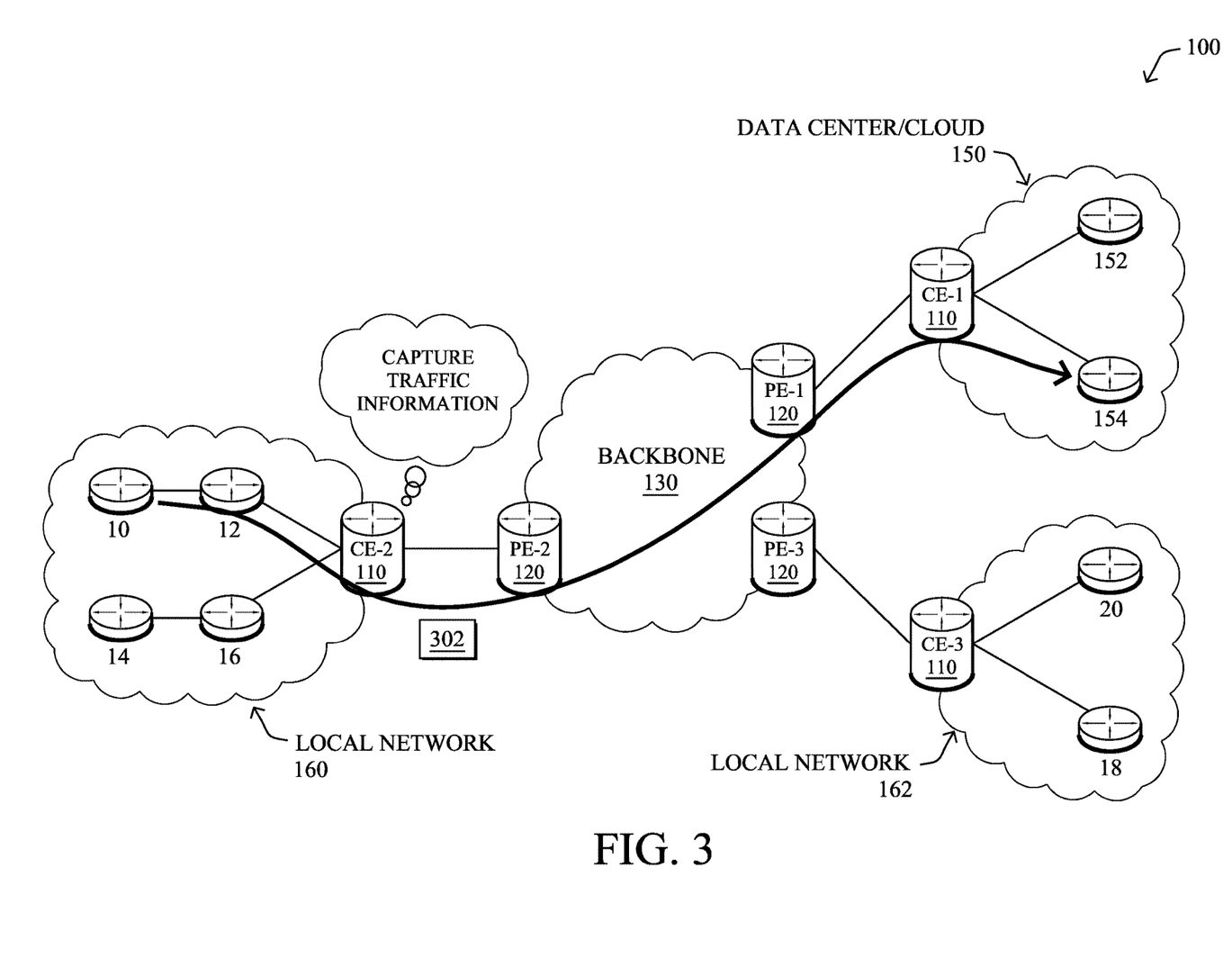
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

More specifically, most device classification systems (DCSs) today rely on simple rules and heuristics to classify devices. For instance, information extracted from DHCP or HTTP traffic can sometimes provide a pretty good clue as to the type of device. Notably, the DHCP vendor class identifier may directly indicate that the device is an Android phone, while the HTTP user agent may reveal more information about the operating system of the device. Similarly, the organizationally unique identifier (OUI) can be used to narrow down potential device types based on the corresponding manufacturer. In further examples, device type classification can be achieved by using active and/or passive probing of devices, to assign a device type and corresponding host profile to a device. Notably, this probing may entail sending any or all of the following probes:
  DHCP probes with helper addresses
  SPAN probes, to get messages in INIT-REBOOT and SELECTING states, use of ARP cache for IP/MAC binding, etc.
  Netflow probes
  HTTP probes to obtain information such as the OS of the device, Web browser information, etc.
  RADIUS probes
  SNMP to retrieve MIB object or receives traps
  DNS probes to get the Fully Qualified Domain Name (FQDN)
  etc.

A DCS may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As the device classification rulesets maintained for different DCSs can differ, their effectiveness to identify a particular device type can also differ. Further, the different classification rulesets may assess different sets of input characteristic data from the telemetry data captured about a device, to flag a device as being of a certain type. In addition, the rulesets may have different capabilities in terms of the device types that they can detect, meaning that one device may be flagged as "UNKNOWN" in one network and. While this heterogeneity typically means varying performance across different DCS deployments, it also presents certain opportunities from a machine learning standpoint to develop next generation DCSs.

Merging and Optimizing Heterogeneous Rulesets for Device Classification

The techniques herein allow device classification rulesets from a collection of device classification systems to be merged and optimized into a single, compact, and coherent machine learning-based classifier that can be sued for device classification (e.g., in the cloud or at the network edge). The resulting classifier shall cover a broader range of device types, exhibit a higher classification accuracy, and allow for more compact representations that are suitable for classification at a network edge.

Specifically, according to one or more embodiments of the disclosure as described in detail below, a device classification service receives a plurality of device classification rulesets, each ruleset associating a set of device characteristics with a device type label. The device classification service forms a unified ruleset by resolving a conflict between conflicting device characteristics from two or more of the device classification rulesets. The device classification service trains a machine learning-based device classifier using the unified ruleset. The device classification service classifies, using telemetry data for a device in a network as input to the trained device classifier, the device with the device type label.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 4:
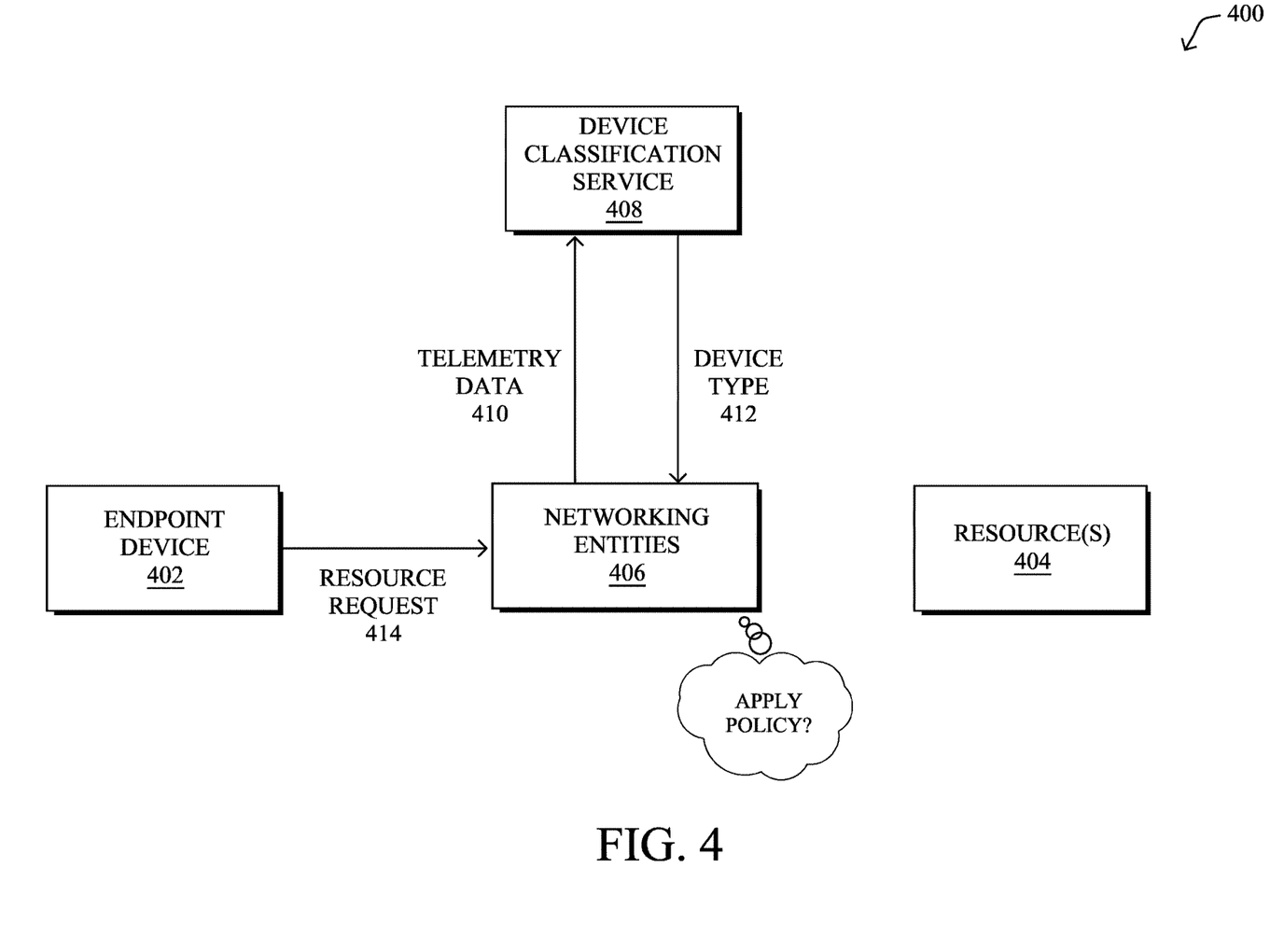
FIG. 4 illustrates an example of a device classification service in a network.

Operationally, FIG. 4 illustrates an example of a device classification service in a network, in various embodiments. As shown, network 400 may generally include an endpoint device 402 (e.g., a user device, a sensor, an actuator, etc.), any number of resources 404, and any number of networking elements 406 that are configured to provide connectivity between endpoint device 402 and resource(s) 404. For example, networking elements 406 may include access points, wireless LAN controllers (WLCs), switches, routers, security devices (e.g., firewalls, device identity services, etc.), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking elements 406 or be in communication therewith. In general, device classification service 408 is configured to take as input telemetry data 410 captured by networking element 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402. In various embodiments, device classification service 408 may use a machine learning-based classifier to classify telemetry data 410 and assign device type 412 to endpoint device 402.

Note that the classification of endpoint device 402 by service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking element 406.

The labeling of endpoint device 402 with a device type 412 by device classification service 408 may initiate enforcement of one or more network policies by networking element 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking elements 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking elements 406 to assign a higher priority to traffic from endpoint device 402.

Figure 5:
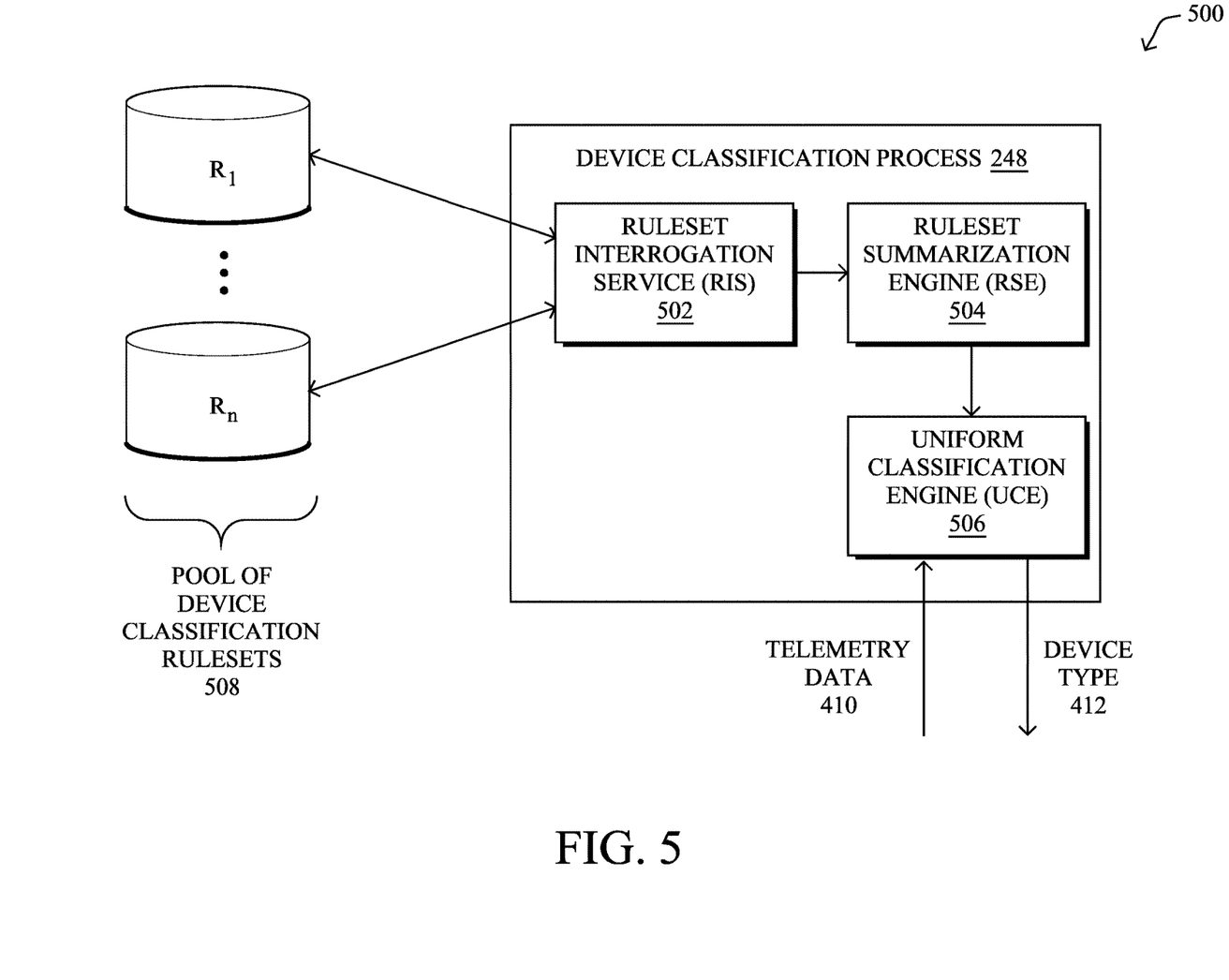
FIG. 5 illustrates an example architecture for merging and optimizing heterogeneous rulesets for device classification.

FIG. 5 illustrates an example architecture for merging and optimizing heterogeneous rulesets for device classification, according to various embodiments. As shown, device classification process 248, which can be used to provide a device classification service (e.g., service 408 shown in FIG. 4) may comprise any or all of the following components: a ruleset interrogation service (RIS) 502, a ruleset summarization engine (RSE) 504, and/or a uniform classification engine (UCE) 506. Further, these components 502-506 may be implemented in a distributed manner or implemented as its own stand-alone service, either as part of the local network under observation or as a remote service. In addition, the functionalities of the components of architecture 500 may be combined, omitted, or implemented as part of other processes, as desired.

Assume, for purposes of illustration, that there is a pool 508 of n-number of device classification rulesets $R_1, \ldots, R_n$ available to device classification process 248. Such rulesets may be of different formats, structures, and extent (e.g., covering different sets of device types and/or telemetry data). In some cases, pool 508 of device classification rulesets may reside locally on the same device executing device classification process 248. However, in most cases, the device classification rulesets in pool 508 may reside in any number of DCSs and across any number of different networks.

The only commonality assumed herein regarding the device classification rulesets is that each of the rulesets in pool 508 can be queried in the following way: given a device $D_i$ described by a vector of attributes $x_i=[x_{i,1}, x_{i,2}, \ldots, x_{i,D}]$, ruleset $R_j$ can be quired such that a device type label $L_{i,j}=R_j(x_i)$ is obtained. In other words, $L_{i,j}$ is the classification of device $D_i$ given by ruleset $R_j$. In some embodiments, $L_{i,j}$ may take the form of a sequence of increasingly detailed device types, such as manufacturer→category→model→version. It is also assumed that if a particular ruleset cannot classify the device, it will return a null or unknown classification.

In various embodiments, device classification process 248 may include ruleset interrogation service (RIS) 502 that offers an application programming interface (API) to the various devices on which pool 508 of device classification rulesets may reside. For example, RIS 502 may interface with any number of different network controllers, management systems, or the like. These systems may build a description of a device in the form of a series of device characteristics attributes summarized as a vector $x_i$, that may be sent to RIS 502, either on a push or pull basis.

More specifically, for any incoming device $D_i$ described by $x_i$, RIS 502 may go through every ruleset $R_j$ and obtain a classification $R_j(X_i)$. In turn, RIS 502 may store the resulting labels in a database that maps so-called feature vectors $x_i$ that describe the underlying device to an N-dimensional vector of labels obtained from each ruleset $R_j$. Note also that RIS 502 may also support the request of mandatory missing attributes for a given ruleset. In other words, RIS 502 may receive ruleset information from pool 508 and, in turn, store mappings between the device characteristics (e.g., packet information, probing information, other telemetry measurements, etc.) from the rulesets and the device type labels in a database.

In further embodiments, ruleset summarization engine (RSE) 504 may take as input the database created and maintained by RIS 502 to generate a summary of all label outcomes in the form of a harmonized, unified ruleset. To achieve this, RSE 504 may use different heuristics to resolve conflicting results (e.g., when a given device is classified differently by different rulesets). In other words, it may very well be the case that there are conflicting device characteristics in the database of RIS 502 for a particular device type that must be harmonized.

In its simplest embodiment, RSE 504 may select the result that appears the most often (majority vote) or the most specific classification (e.g., device model instead of device manufacturer).

In more sophisticated embodiments, RSE 504 may rely on statistical methods to weigh rulesets differently based on their accuracy for a category of device. Indeed, some vendors are specializing in certain verticals, and will achieve much more accurate classifications in these categories. One way to achieve such a result is for RSE 504 to use a two-pass process. In the first pass, RSE 504 may evaluate rulesets against different metrics (e.g., specificity of the classifications, proportion of null classifications, coherence with other rulesets, flip-flops) for different portions of the dataset. These portions may typically be defined by splitting the dataset into different verticals (when available) or by using a clustering algorithm such as DB-scan). In the second pass, RSE 504 may select the outcome of the best-performing ruleset. In other words, RSE 504 may build the unified ruleset based on the predictions of the various rulesets on a stream of samples coming from any number of different networks.

In yet another embodiment, RSE 504 may compute a trust score for each ruleset $R_j$, according to various criteria such as the level of "agreement" with other ruleset for a given class of device. Such an agreement measurement can be used to see if a given ruleset tend to be coherent with others, in order to compute a trust score for the ruleset. RSE 504 may also use other metrics, such as explicit feedback from one or more users, so as to refine the trust score for a given ruleset and class of device type. Note that RSI 504 may also compute an overall score based on the level of consensus provided by the set of ruleset for a given device type.

A further component of architecture 500 is uniform classification engine (UCE) 506, which takes the summarized dataset of feature vectors $x_i$ mapped to the label selected by RSE 504 and builds a classifier out of this dataset, in various embodiments. Example machine learning models that may be used in this context include an ensemble of decision trees, such as a random forest, gradient boosted trees, or the like. In other embodiments, the classifier may comprise a Deep Neural Networks (DNN) depending on the amount of available data. Note that tree-based models are particularly amenable to being interpreted as a set of rules similar to those of the original classification systems.

The resulting classifier of UCE 506 can therefore be used directly to perform device classification and provide a broader coverage of device types, a higher classification accuracy, and a more compact representation, more suitable for being used at the edge. For example, as shown, UCE 506 may use telemetry data 410 captured about a device in a network as input to its trained classifier, to label the device with device type 412, as detailed previously with respect to FIG. 4.

Figure 6:
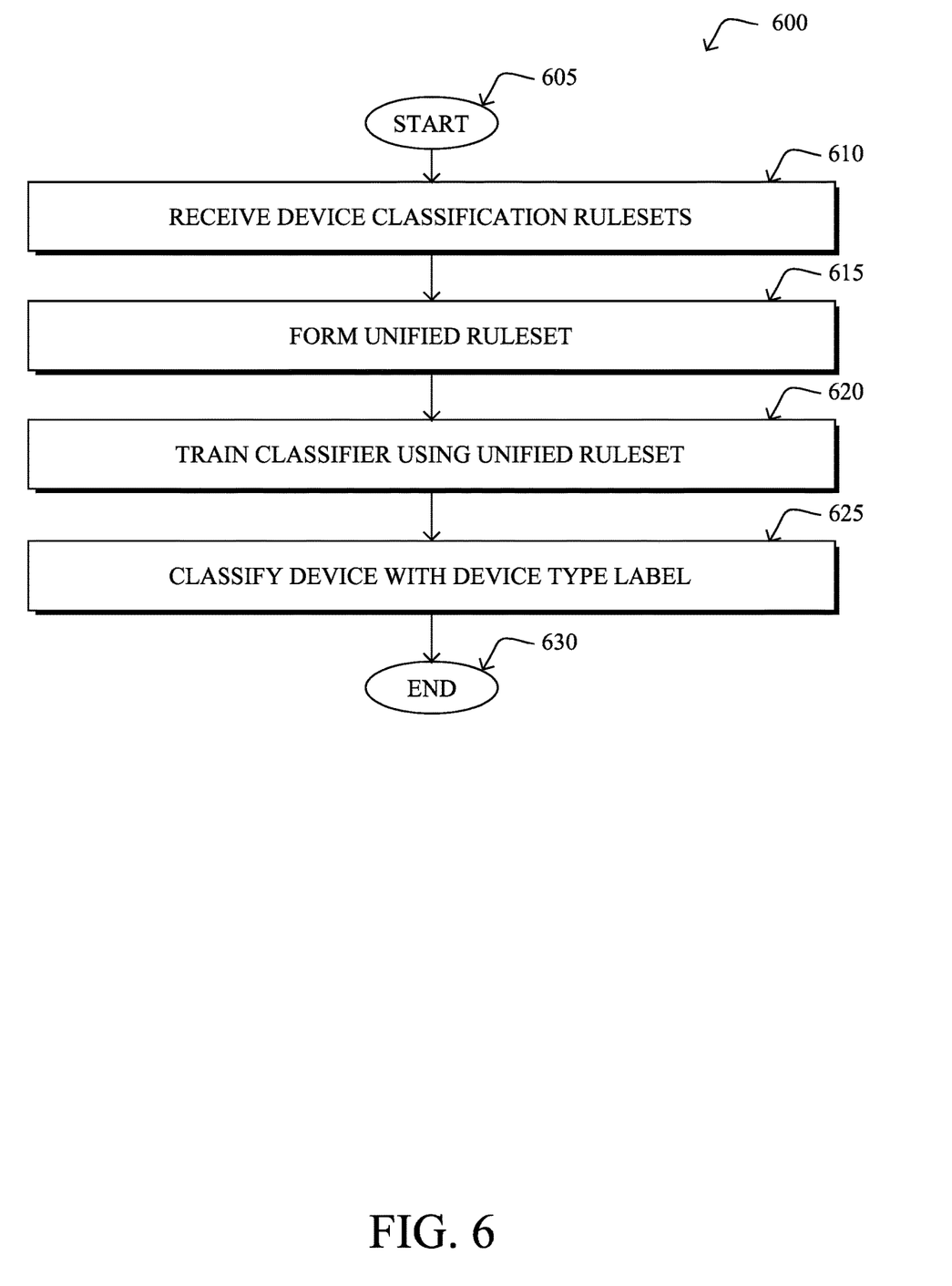
FIG. 6 illustrates an example simplified procedure for merging and optimizing heterogeneous rulesets for device classification.

FIG. 6 illustrates an example simplified procedure for merging and optimizing heterogeneous rulesets for device classification in a network, in accordance with one or more embodiments described herein. For example, a non-generic, specifically configured device (e.g., device 200) may perform procedure 600 by executing stored instructions (e.g., process 248) to provide a device classification service to any number of networks. The procedure 600 may start at step 605, and continues to step 610, where, as described in greater detail above, the device classification service may receive a plurality of device classification rulesets, each ruleset associating a set of device characteristics with a device type label. In many cases, the rulesets may be from different networks and/or systems and may also differ in terms of the device characteristics and/or device type labels they contain.

At step 615, as detailed above, the device classification service may form a unified ruleset by resolving a conflict between conflicting device characteristics from two or more of the device classification rulesets, as described in greater detail above. In other words, the different device classification rulesets may look to different device characteristics (e.g., measured telemetry data values) to determine the device type of a given device. Consequently, there may be conflicts in terms of the mappings between these values and the various device type labels possible. In some embodiments, the service may select device characteristics for inclusion in the unified ruleset by testing the rulesets against any number of devices and weighting the rulesets according to their accuracies. By doing so, the service can include those characteristics from the best performing rulesets for a given device type label. In another embodiment, the service may select a characteristic that appears most frequently for a given device type label. In a further embodiment, the service may assign trust scores to the rulesets that can be used to resolve conflicts. Such trust scores can be based on the level of agreement between the rulesets, their specificities in terms of device types, their sources, user feedback, combinations thereof, or the like.

At step 620, as detailed above, the device classification service may train a machine learning-based device classifier using the unified ruleset. In some embodiments, the machine learning-based device classifier may comprise an ensemble of decision trees. Such an implementation allows for the service to provide feedback to a user interface regarding why a particular device was classified with a particular device type. In further embodiments, however, other machine learning models can also be trained, such as deep neural networks or the like.

At step 625, the device classification service may classify, using telemetry data for a device in a network as input to the trained device classifier, the device with the device type label. In other words, the classifier may assess the set of characteristics of the device, as captured by the telemetry data, and label the device with one of the device type labels on which the classifier was trained. In turn, the service may provide an indication of the device type label to one or more networking elements in the network of the device for purposes of policy enforcement. For example, the networking element may, based on the type of the device, block the device from accessing certain resources via the network. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the merging and use of device classification rulesets, for purposes of training a machine learning-based device type classifier and in a way that does not simply aggregate the classification rules. In various aspects, the techniques herein allow for certain rulesets to be favored over others, such as based on their performance, user input, expertise in a certain vertical (e.g., medical devices, retail devices, etc.), or the like. In further aspects, the techniques herein also allow for the construction of a training dataset for the classifier based on the predictions of these rulesets, as applied to any number of samples from the various networks.

While there have been shown and described illustrative embodiments that provide for merging and optimizing heterogeneous rulesets for device classification, it is to be understood that various other adaptations and modifications may be made within the spirit and scope of the embodiments herein. For example, while certain embodiments are described herein with respect to using certain models for purposes of device classification, the models are not limited as such and may be used for other functions, in other embodiments. In addition, while certain protocols are shown, such as HTTP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device classification service, a plurality of device classification rulesets, wherein each ruleset of the device classification rulesets comprises rules configured to output a device type label for a particular device based on device data indicative of attributes of the particular device;
   forming, by the device classification service, a unified ruleset by resolving a conflict between conflicting device characteristics from two or more of the device classification rulesets;
   training, by the device classification service, a machine learning-based device classifier using the unified ruleset; and
   classifying, by the device classification service and using telemetry data for a device in a network as input to the trained device classifier, the device with the device type label.

2. The method as in claim 1, wherein the device type is indicative of at least one of: a device manufacturer, a device model, or a device version.

3. The method as in claim 1, further comprising:
   providing, by the device classification service, an indication of the classification to a networking entity in the network that applies a network policy to the device based on the device type label.

4. The method as in claim 3, wherein the networking entity applies the network policy to the device by preventing the device from communicating with a network resource.

5. The method as in claim 1, wherein forming the unified ruleset by resolving a conflict between device characteristics from two or more of the device classification rulesets comprises:
   determining accuracy measures for the rulesets by testing the rulesets against one or more devices of the device type; and
   selecting the device characteristic for inclusion in the unified ruleset from among the conflicting device characteristics based on the determined accuracy measures for the rulesets.

6. The method as in claim 1, wherein forming the unified ruleset by resolving a conflict between device characteristics from two or more of the device classification rulesets comprises:
   selecting the device characteristic for inclusion in the unified ruleset from among the conflicting device characteristics that appears most often among the device classification rulesets.

7. The method as in claim 1, wherein forming the unified ruleset by resolving a conflict between device characteristics from two or more of the device classification rulesets comprises:
   assigning trust scores to the device classification rulesets based on their agreement with one another; and
   selecting the device characteristic for inclusion in the unified ruleset from among the conflicting device characteristics based on the trust scores assigned to the device classification rulesets.

8. The method as in claim 1, wherein the device classification rulesets comprise feature vectors of the attributes of the particular device.

9. The method as in claim 1, wherein the trained classifier comprises an ensemble of decision trees.

10. The method as in claim 1, wherein the device classification service receives the device classification rulesets from a plurality of different networks.

11. An apparatus, comprising:
    one or more network interfaces to communicate with a network;
    a processor coupled to the network interfaces and configured to execute one or more processes; and
    a memory configured to store a process executable by the processor, the process when executed configured to:
       receive a plurality of device classification rulesets, wherein each ruleset of the device classification rulesets comprises rules configured to output a device type label for a particular device based on device data indicative of attributes of the particular device;
       form a unified ruleset by resolving a conflict between conflicting device characteristics from two or more of the device classification rulesets;
       train a machine learning-based device classifier using the unified ruleset; and
       classify, using telemetry data for a device in a network as input to the trained device classifier, the device with the device type label.

12. The apparatus as in claim 11, wherein the device type is indicative of at least one of: a device manufacturer, a device model, or a device version.

13. The apparatus as in claim 11, wherein the process when executed is further configured to:
    provide an indication of the classification to a networking entity in the network that applies a network policy to the device based on the device type label, wherein the networking entity applies the network policy to the device by preventing the device from communicating with a network resource.

14. The apparatus as in claim 11, wherein the apparatus forms the unified ruleset by resolving a conflict between device characteristics from two or more of the device classification rulesets by:
   determining accuracy measures for the rulesets by testing the rulesets against one or more devices of the device type; and
   selecting the device characteristic for inclusion in the unified ruleset from among the conflicting device characteristics based on the determined accuracy measures for the rulesets.

15. The apparatus as in claim 11, wherein the apparatus forms the unified ruleset by resolving a conflict between device characteristics from two or more of the device classification rulesets by:
   selecting the device characteristic for inclusion in the unified ruleset from among the conflicting device characteristics that appears most often among the device classification rulesets.

16. The apparatus as in claim 11, wherein the apparatus forms the unified ruleset by resolving a conflict between device characteristics from two or more of the device classification rulesets by:
   assigning trust scores to the device classification rulesets based on their agreement with one another; and
   selecting the device characteristic for inclusion in the unified ruleset from among the conflicting device characteristics based on the trust scores assigned to the device classification rulesets.

17. The apparatus as in claim 11, wherein the device classification rulesets comprise feature vectors of the attributes of the particular device.

18. The apparatus as in claim 11, wherein the trained classifier comprises an ensemble of decision trees, and wherein the process when executed is further configured to provide feedback to a user interface regarding why the classifier classified the device with the device type label.

19. The apparatus as in claim 11, wherein the apparatus receives the device classification rulesets from a plurality of different networks.

20. A tangible, non-transitory, computer-readable medium storing program instructions that cause a device classification service to execute a process comprising:
   receiving, at the device classification service, a plurality of device classification rulesets, wherein each ruleset of the device classification rulesets comprises rules configured to output a device type label for a particular device based on device data indicative of attributes of the particular device;
   forming, by the device classification service, a unified ruleset by resolving a conflict between conflicting device characteristics from two or more of the device classification rulesets;
   training, by the device classification service, a machine learning-based device classifier using the unified ruleset; and
   classifying, by the device classification service and using telemetry data for a device in a network as input to the trained device classifier, the device with the device type label.

* * * * *

UNITED STATES PATENT AND TRADEMARK OFFICE
CERTIFICATE OF CORRECTION

PATENT NO. : 11,232,372 B2
APPLICATION NO. : 16/185086
DATED : January 25, 2022
INVENTOR(S) : Grégory Mermoud It is certified that error appears in the above-identified patent and that said Letters Patent is hereby corrected as shown below:

In the Specification

Column 8, Lines 38-39, should read:
device types that they can detect.

Signed and Sealed this
Thirty-first Day of May, 2022

Katherine Kelly Vidal
*Director of the United States Patent and Trademark Office*